Nov. 2, 1948.　　　　　D. B. SMITH　　　　　2,452,960
METHOD AND APPARATUS FOR INDICATING FREQUENCY
COINCIDENCE BETWEEN ALTERNATING
CURRENTS OR VOLTAGES

Filed Dec. 30, 1944　　　　　　　　　　　7 Sheets-Sheet 1

INVENTOR.
DAVID B. SMITH
BY Howson & Howson
Attys.

INVENTOR.
DAVID B. SMITH

Nov. 2, 1948.　　　　　D. B. SMITH　　　　　2,452,960
METHOD AND APPARATUS FOR INDICATING FREQUENCY
COINCIDENCE BETWEEN ALTERNATING
CURRENTS OR VOLTAGES
Filed Dec. 30, 1944　　　　　　　　　　7 Sheets-Sheet 5

INVENTOR.
DAVID B. SMITH
BY Howson & Howson
Attys.

Nov. 2, 1948.                    D. B. SMITH                    2,452,960
       METHOD AND APPARATUS FOR INDICATING FREQUENCY
              COINCIDENCE BETWEEN ALTERNATING
                   CURRENTS OR VOLTAGES
Filed Dec. 30, 1944                                  7 Sheets-Sheet 6

INVENTOR.
DAVID B. SMITH
BY Howson + Howson
Attys.

Patented Nov. 2, 1948

2,452,960

UNITED STATES PATENT OFFICE 2,452,960

METHOD AND APPARATUS FOR INDICATING FREQUENCY COINCIDENCE BETWEEN ALTERNATING CURRENTS OR VOLTAGES

David B. Smith, Flourtown, Pa., assignor, by mesne assignments, to Philco Corporation, Philadelphia, Pa., a corporation of Pennsylvania Application December 30, 1944, Serial No. 570,714

24 Claims. (Cl. 250—39)

This invention relates primarily to a system and method for accurately and usefully indicating frequency coincidence (zero beat) as respects two high frequency electric waves—more especially where random phase relations obtain between the two waves, and where the frequency of at least one of said waves is continuously changing; and it also relates to a system and method of calibrating high frequency instruments such as frequency meters of the signal generator type, and other devices of precision character.

One of the principal objects is to reduce the time required to calibrate certain high frequency precision instruments.

Another object is to devise means operative to produce electric pulses in response to and concurrently with zero beats of substantially infinitesimal duration—which pulses are consistently suitable for triggering a recording mechanism, irrespective of the phase relation which may happen to obtain between the interacting signal waves when their frequencies instantaneously coincide.

A further object is to provide an automatic calibrator for high frequency meters and the like, which is capable of operating rapidly while at the same time ensuring a very high order of precision.

Still another object is to provide a high frequency calibrating instrument which is stable in operation and not difficult to maintain.

An additional object is to provide improved means for detecting occurrences of zero beat between coacting waves.

The specific disclosure herein pertains to an automatic calibrator whose function is to record accurately and speedily a large number of dial readings of a frequency meter or signal generator—each of which dial readings corresponds to an individual frequency. The frequency meter has two wave bands, namely: 125 k. c. to 250 k. c., and 2.0 megacycles to 4.0 megacycles, respectively, and it is a prescribed requirement that the low band (125–250 k. c.) be calibrated at 1 k. c. intervals by comparison with signals from a standard signal generator, and that the high band be similarly calibrated at 10 k. c. intervals. Accuracy within .01 percent was specified with respect to each of the aforementioned calibration points—there being 327 such calibration points per instrument. In addition, intermediate points at 0.1 k. c. intervals for the low band and 1 k. c. intervals for the high band are calibrated by interpolation. That is to say, the dial readings corresponding to intermediate frequencies are computed and recorded after the dial readings corresponding to the 327 principal calibration points have been determined precisely by the automatic calibrator.

The standard signal generator with which comparison is made is designed to generate successively two distinct bands of harmonic frequencies, each band extending from 2.0 megacycles to 4.0 megacycles and composed of harmonics occurring at intervals of 10 kilocycles and 16 kilocycles respectively. That is to say, one band comprises a series of discrete harmonic frequencies of 2000 k. c., 2010 k. c., 2020 k. c., etc., up to 4000 k. c.—making a total of 201—while the other band comprises harmonic frequencies of 2000 k. c., 2016 k. c., 2032 k. c., etc., up to 4000 k. c.—making a total of 126—the grand total being 327, which equals the number of principal calibrations per instrument.

In the operation of the system the tuning shaft of the instrument under calibration is power driven at a uniform speed from one end of its dial scale to the other, and said instrument (which is itself a signal generator) puts out a signal wave which varies in frequency continuously from 250 k. c. to 125 k. c.; and thereafter, upon reversal of rotation, it puts out a signal which varies in frequency continuously from 2.0–4.0 megacycles—the first mentioned band of frequencies (the low band) being multiplied sixteen times in order to produce a band of 2.0 to 4.0 megacycles for comparison with the corresponding standard signal generator band. It is important to observe that the high band is the sixteenth harmonic of the low band.

The high frequency output of the instrument under calibration combines, first, with each consecutive harmonic of one band and then with each consecutive harmonic of the other band of the two standard signal generator bands previously mentioned, and there is produced a momentary or instantaneous zero beat each time the output frequency of the instrument under calibration coincides with one of said harmonics.

The occurrence of a zero beat means, obviously, that the instrument under calibration is generating a signal wave of exactly the same frequency (or a sub-multiple thereof) as one of the harmonics of the standard signal generator; and no problem would be involved in obtaining a record of the dial reading at each zero beat occurrence if it were not for the fact that the shaft of the instrument undergoing calibration is being driven continuously—which renders it impracticable to obtain reliable indications through previously known methods of detecting the zero beats. Since time-saving is of the essence of this invention, it goes without saying that the instrument being calibrated cannot be stopped and adjusted to each zero beat position— such being the time-consuming procedure previously followed.

If the two interacting signal waves which combine to produce the zero beats were always in phase or never too greatly out of phase when the zero beats occur, it may be that no serious difficulty would be encountered in obtaining usable indications of the momentary zero beats, which could be translated automatically into a permanent record of the dial settings corresponding to each of the 327 principal calibration frequencies. But, unfortunately, the phase relation between the two beating waves is entirely random. That is to say, the phase angle may be anything from zero to 360°. For that reason it is not practicable to obtain directly from the beat wave a voltage or current pulse which will in every case be of such character that it can be distinguished from non-zero-beat pulses. The present invention affords an effective solution of that problem in that it provides an indirect means whereby instantaneous zero-beat occurrences are caused to produce substantially uniform distinguishable pulses irrespective of the phase angle which may obtain between the two interacting waves when their frequencies coincide.

The solution of the problem may be resolved into a series of major steps, the first of which consists in deriving two beat waves which are preferably identical but differ in phase by 90 degrees—the two quadrature-related beat waves each being generated by combining wave energy from the frequency meter or other instrument under calibration with wave energy from the standard signal generator. At each frequency coincidence the two beat waves are momentarily of zero frequency, but their amplitudes differ by 90 degrees, due to the aforesaid phase difference.

The second step consists in so operating, individually, upon each of the two quadrature-related beat waves that a sharp voltage change is brought about in response to the low rate of change of frequency which occurs at and immediately adjacent zero frequency. This step involves, preferably, integration or partial intergration of the two beat waves, but it can be accomplished, albeit less simply, by differentiation or partial differentiation or by other equivalent processes capable of translating frequency changes into amplitude changes.

The third step consists in impressing simultaneously upon separate square-law detector stages the quadrature-related integrated voltages produced by the aforesaid second step and by adding the outputs of the two square-law detector stages. The result of this operation is, in each instance, a voltage pulse of predetermined amplitude, wave-front and polarity in step with each successive zero beat and capable of being utilized to effect an accurate permanent record of the frequency meter dial setting for each frequency at which automatic calibration is required.

Another feature of this invention is predicated upon my discovery that increased accuracy of calibration can be achieved by frequency-multiplying the outputs of the frequency meter and of the standard signal generator and, further, that said outputs can be heterodyned down to a convenient intermediate frequency prior to frequency multiplication without introducing any inaccuracy; and that by virtue of such heterodyne it is possible to maintain the aforementioned quadrature phase relation throughout the calibrating cycle without any readjustment being necessary, and with a considerable gain as respects simplification of tuning.

Other features and objects of this invention will be noted as the detailed description progresses; and it will become apparent that certain novel features and subcombinations are prospectively useful for purposes other than automatic calibration of radio instruments.

The subject matter herein disclosed has to a large extent been published in an article appearing in the May 1944 issue of "Electronics," McGraw-Hill Publishing Co., page 98 et seq.; and certain details of interest to those skilled in the art but not essential for purposes of this application will be found in the aforesaid article. Said article embraces the present invention and, in addition, certain inventions of David Sunstein and Joseph Tellier and possibly other inventors who collaborated in the development of the automatic calibrator described in the "Electronics" article.

The present application is a continuation in part of the co-pending joint application of Joseph Tellier and the present applicant, David B. Smith, Serial No. 538,070, filed May 30, 1944.

As regards the subject matter being claimed in the present application, the present applicant is the sole inventor of such subject matter, the said Joseph Tellier having been included as a co-inventor thereof in the prior application through inadvertence or mistake. This is confirmed by the said Joseph Tellier in a statement attached to and made a part of the present application.

Referring to the drawings:

Fig. 1 is a block diagram covering the entire system;

Fig. 2, 3, 4 and 5, jointly, constitute a circuit diagram of what will be called the electrical end of the system;

Figure 1:
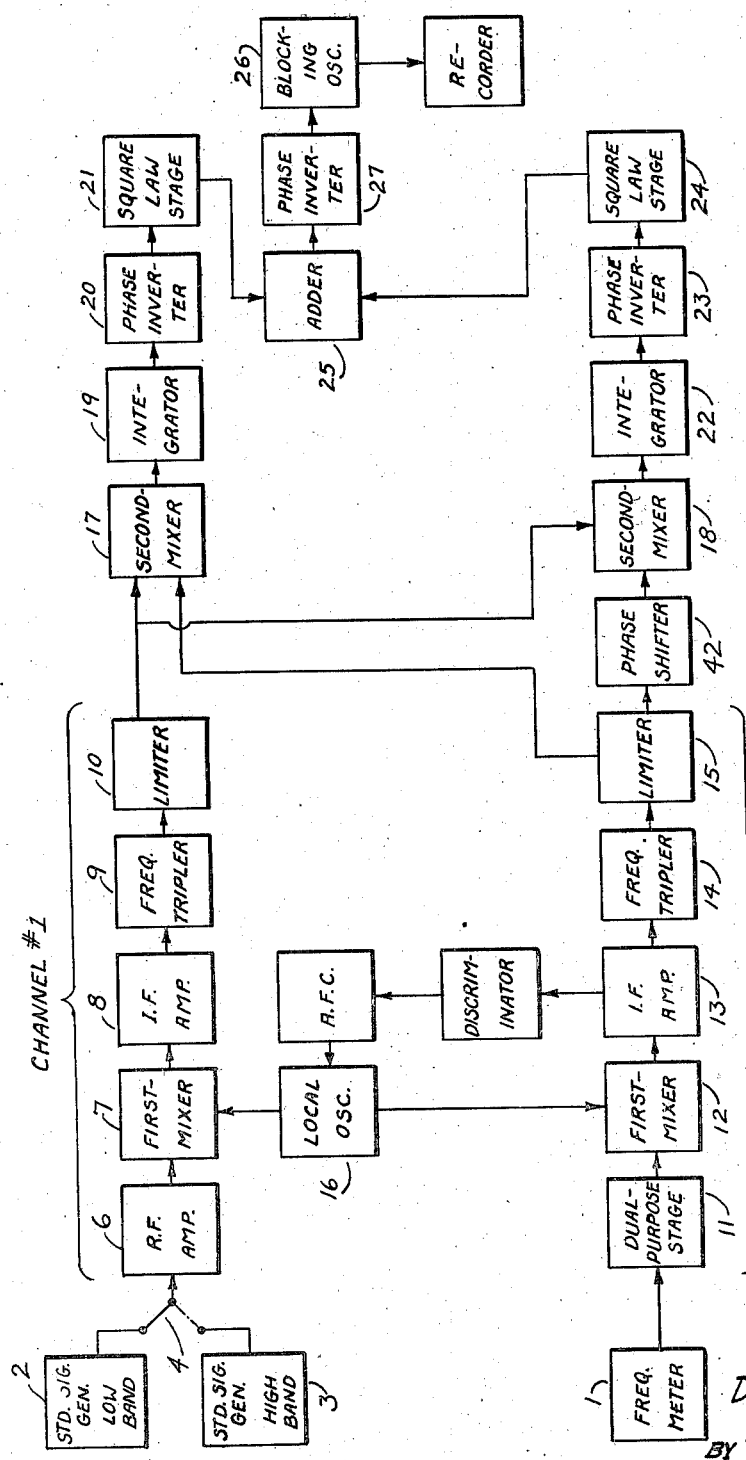
Figure 2:
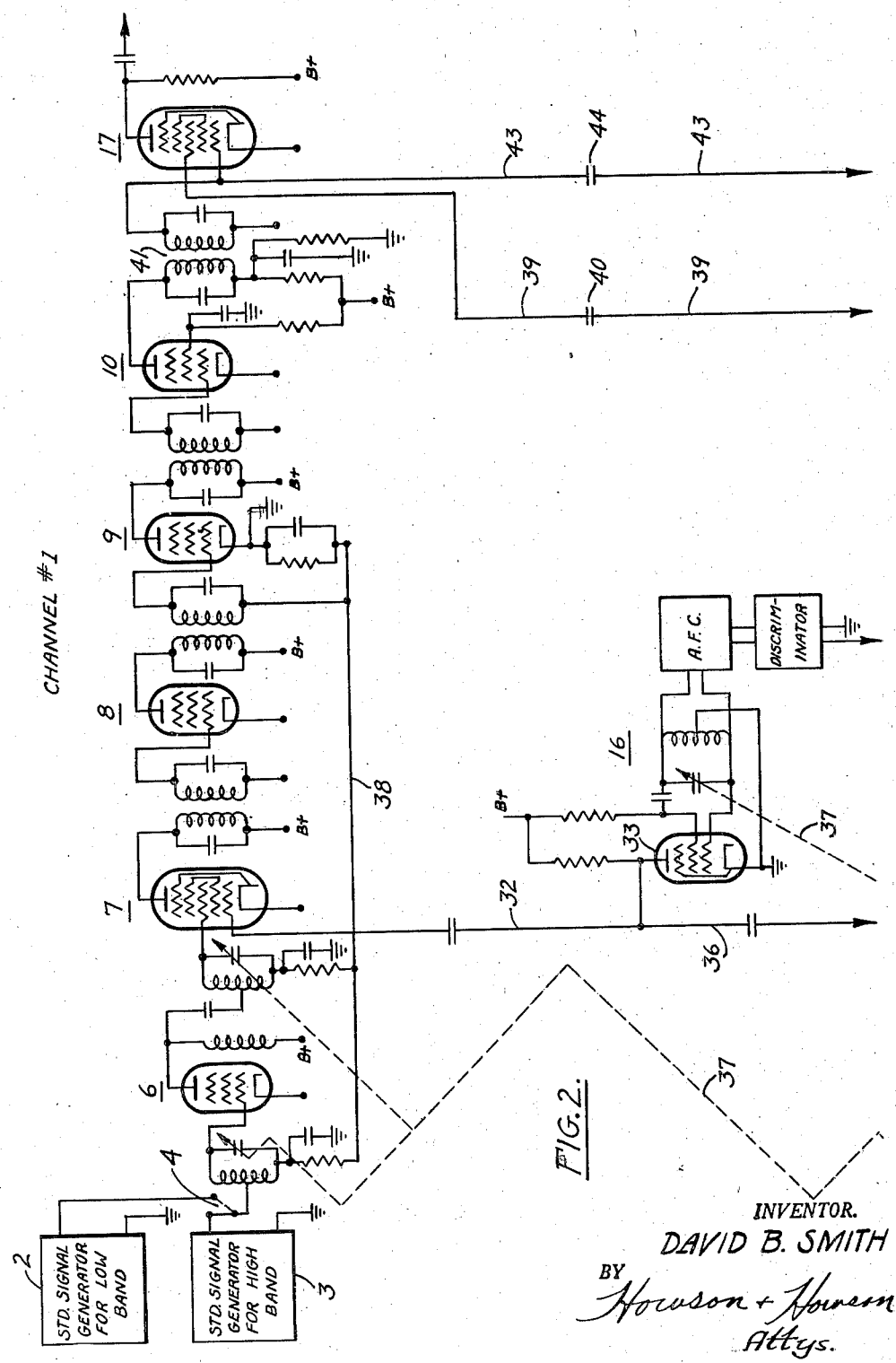
Figure 4:
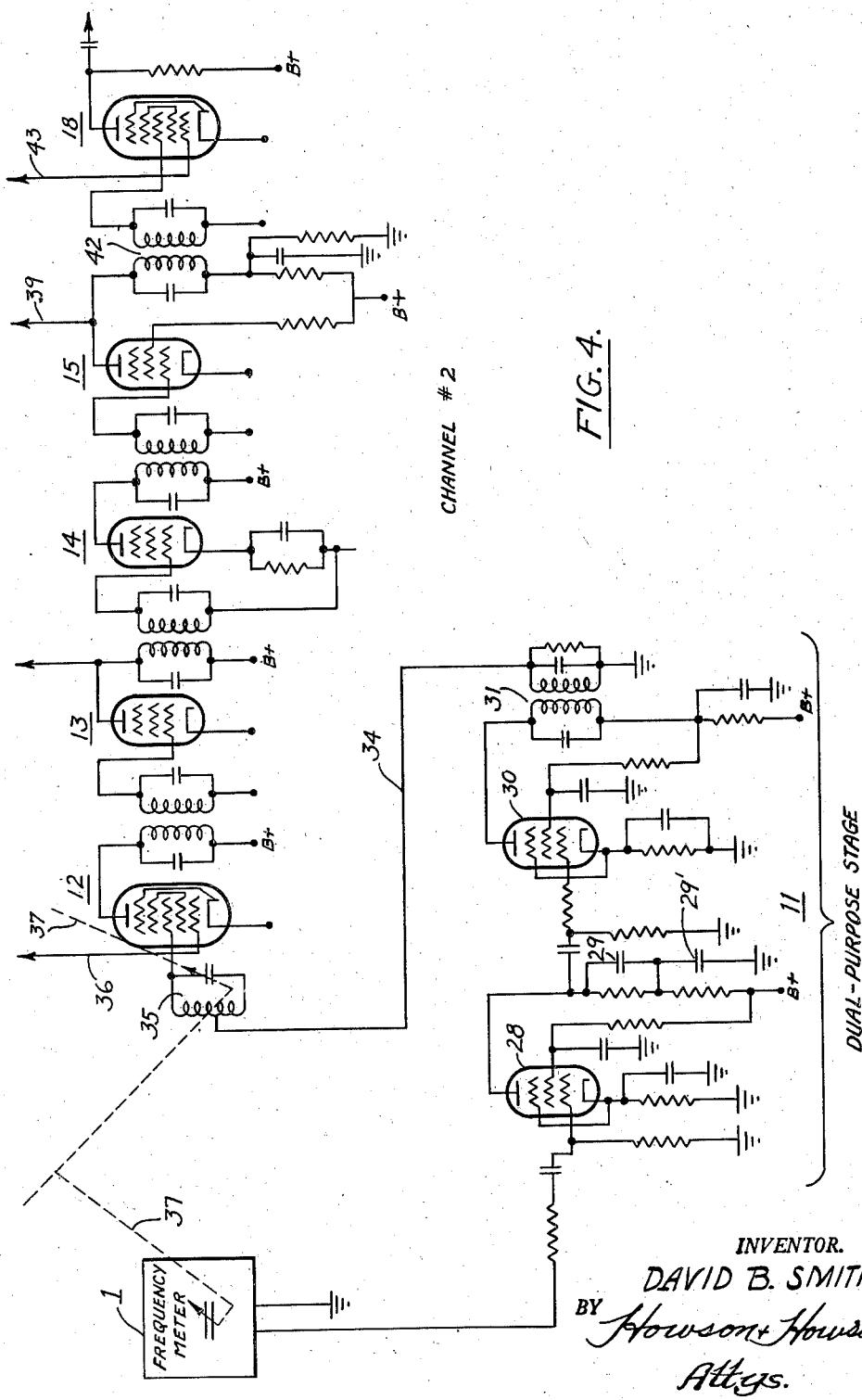
Figure 5:
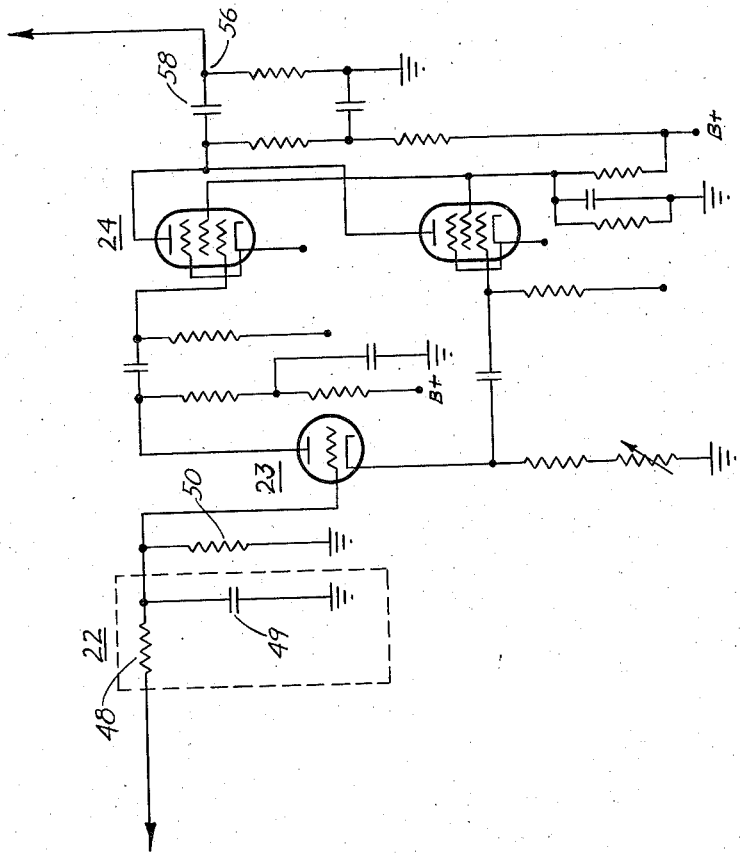
Figure 6:
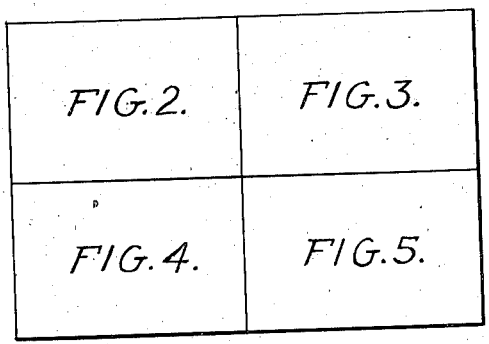
Fig. 6 is a block diagram illustrating how Figs. 2, 3, 4 and 5, should be arranged to form a complete and connected circuit diagram.

In both the block diagram, Fig. 1, and the circuit diagram, Fig. 4, a frequency meter under calibration is identified by reference numeral 1. As previously indicated, this frequency meter covers two bands, namely 125—250 k. c. (the low band) and 2.0–4.0 megacycles (the high band). The designation "frequency meter" is employed here in order to conform to U. S. Army terminology; but the instrument referred to is what would more commonly be called a signal generator.

Calibration is accomplished by starting at the 250 k. c. end of the low band and turning the dial of the meter at a constant speed until it reaches the 125 k. c. end, and then switching the meter to the high band and reversing the direction of rotation. The dial is then turned at the same constant speed in the reverse direction. Calibration of the high band proceeds from the 2.0 megacycle end to the 4.0 megacycle end, whereupon the operation is completed, insofar as the automatic calibrator is concerned.

Block 2 represents a standard signal generator for the low band while block 3 represents a standard signal generator for the high band. These, together, may constitute a single generator which is adjustable to propagate the two separate series of harmonics consecutively; but to simplify the illustration and description I have chosen to show two separate and distinct generators.

A two-way switch 4, which may be automatically operated, serves to shift from one standard signal generator to the other. When in use, the low band standard signal generator puts out, continuously, a series of harmonic frequencies which are multiples of sixteen kilocycles. The lowest harmonic employed in this band is the 125th—which has a frequency of 2000 k. c. or 2.0 megacycles. The next employed harmonic in the low band is the 126th—which has a frequency of 2016 k. c.; and the next, the 127th, has a frequency 16 k. c. higher or 2032 k. c. Thus, the low band consists of 126 harmonic frequencies spaced at 16 k. c. intervals, extending from 2000 k. c. to 4000 k. c. It is to be understood that although the low band of the frequency meter is 125-250 k. c., the output of the low band standard signal generator is 2.0-4.0 megacycles—which is the 16th multiple of 125-250 k. c. It will now be observed that the 16 k. c. intervals between successive low band harmonics put out by standard signal generator 2 are proportionate to 1 k. c. intervals in the frequency meter low band.

Now let us consider the high band standard signal generator 3. When this is in operation it puts out, continuously, a series of harmonic frequencies which are multiples of ten kilocycles. The lowest employed harmonic of this series is the two-hundredth, which has a frequency of 2000 k. c. or 2.0 megacycles. The next employed harmonic in the high band is the 201st, which has a frequency of 2010 k. c. or 2.01 megacycles. Thus, in passing through the high band there is a harmonic at each succeeding ten kilocycle interval instead of each sixteen kilocycle interval.

Calibration of the frequency meter is accomplished by producing an indication each time the output frequency of said meter is either equal to one of the signal generator high band harmonics (as in calibrating the high band of the meter), or is equal to one-sixteenth of one of the signal generator low band harmonics; and this is done by heterodyning the frequency meter output with the outputs of the standard signal generators consecutively to produce a zero beat for each successive frequency coincidence. Thus, in calibrating the low band zero beats are produced at 1 k. c. intervals between 125 k. c. and 250 k. c. In order to do this it is necessary to multiply the low band output frequency of the frequency meter by sixteen—thus producing a 2.0-4.0 megacycle band.

In calibrating the high band, zero beats are produced at 10 k. c. intervals between 2.0 megacycles and 4.0 megacycles.

At the outset the frequency meter is adjusted manually to generate 250 k. c. at a predetermined dial reading; and is further adjusted in the high band to generate 4.0 megacycles at the same dial reading.

Figure 3:
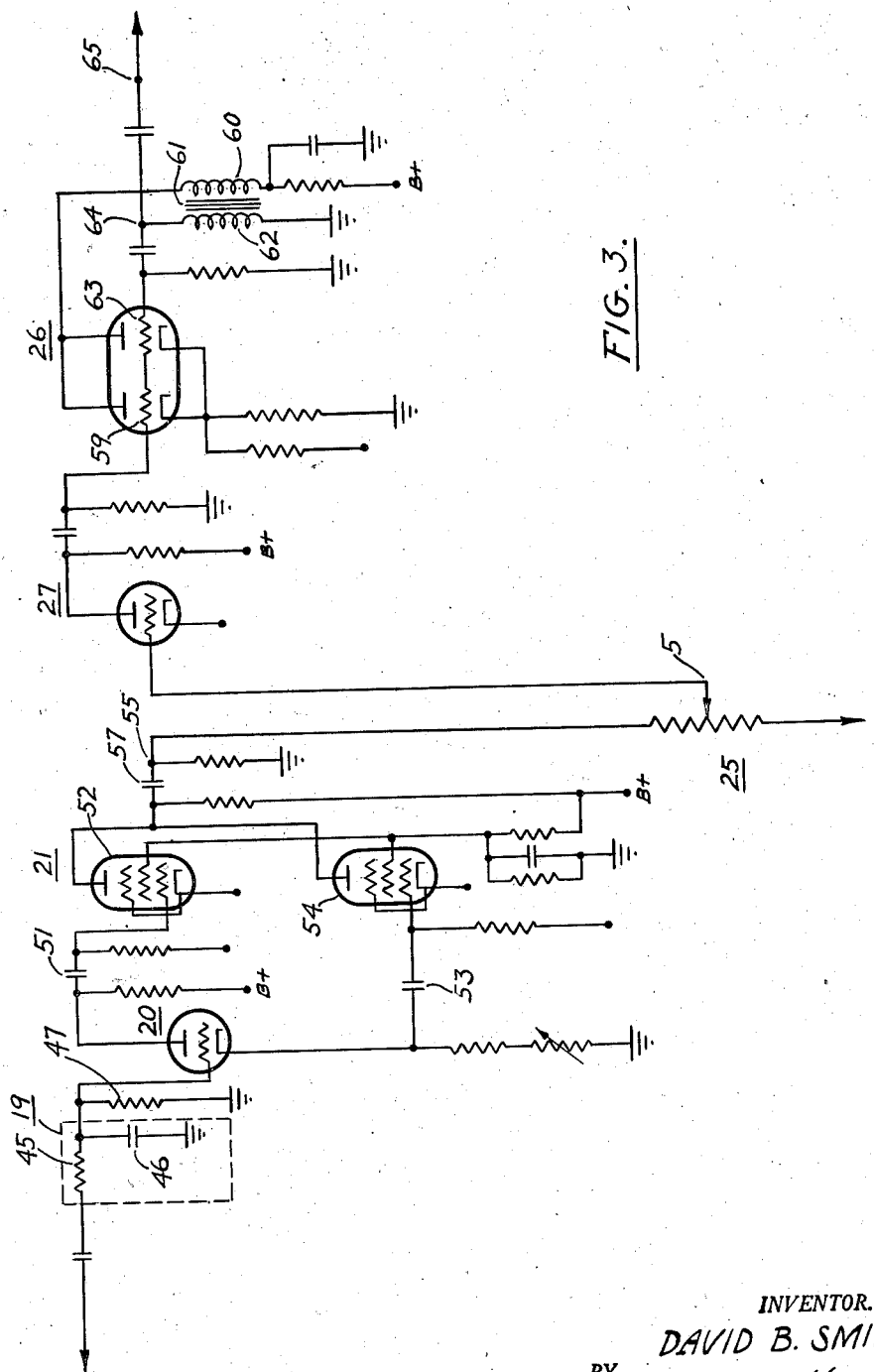

At every zero beat there is produced at point 5 (Fig. 3) a voltage pulse capable of being employed to record the frequency meter dial reading corresponding to the coincident output frequency thereof.

The usual practice is to make a log book for each frequency meter, in which is recorded the dial readings corresponding to the several zero beat frequencies, as determined by the automatic calibrator; and, in addition, further dial readings are computed at one-tenth intervals between the readings corresponding to zero beat frequencies—which latter readings are also entered in the log book. The graph of dial readings plotted against frequencies is sufficiently linear between consecutive zero beat frequencies to enable the intermediate readings to be interpolated without excessive error.

From what has been said it should be apparent that each zero beat or frequency coincidence is of infinitesimal duration; and inasmuch as the shaft of the frequency meter is moving continuously at a substantial speed it is evident that each successive period during which the beat frequency is close to zero is of exceedingly short duration. This appears to render it impossible by any previously known method of which I am aware to obtain sufficiently accurate indications of the zero beat points; and this is doubly true because there is no fixed phase relation between the component waves at and adjacent zero beat. To illustrate this point, reference is made to Fig. 7, which comprises a number of superimposed sine-wave graphs of beat waves which may be assumed to have resulted from combining and detecting pairs of component waves—which pairs are identical except as to the phase relation which happened to obtain between them at frequency coincidence. Curve A represents a beat wave produced by components which were exactly in phase at frequency coincidence. At zero frequency the amplitude of curve A is maximum. Curve B represents a beat wave produced by the same components as curve A but having a phase difference of 45°. Here the amplitude at zero frequency is something less than maximum. Curve C is indicative of what happens at frequency coincidence (zero beat) when the phase angle between the component waves, at that instant, is 90°. It will be noted that the amplitude in the latter case is zero. Since there are an infinite number of possible phase angles, there are, correspondingly, an infinite number of possible beat wave forms—those shown in Fig. 7 being merely representative.

Figure 7:
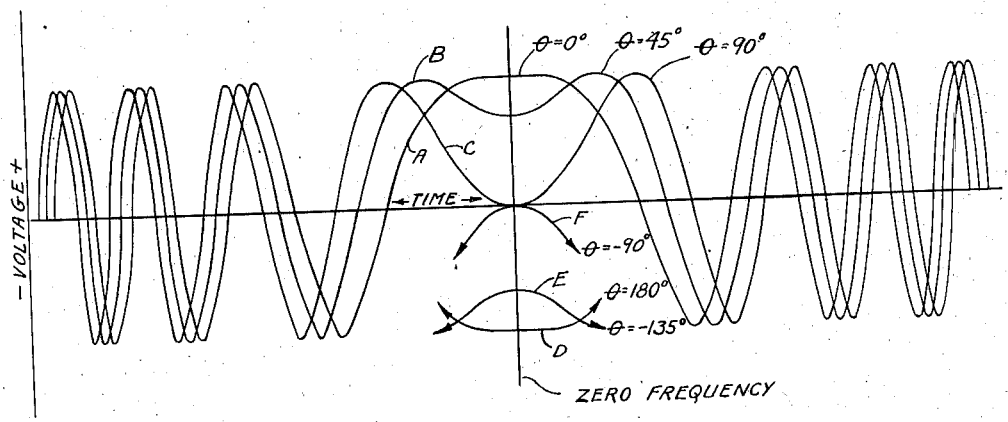
Fig. 7 is a composite graph of several beat waves, showing the effects of various phase angles upon the instantaneous amplitude at zero frequency.

In addition to curves A, B, and C, there are also included in Fig. 7 three incomplete curves marked D, E, and F, respectively. Each of these latter curves, if completed, would be the converse, respectively, of curves A, B, and C; and they result from phase angles of 180°, −135° and −90°. It is clear from Fig. 7 that the beat wave voltage at frequency coincidence may be either positive, negative or zero and that the probabilities, as between positive and negative, are equal, since the phase angle is wholly fortuitous.

The equation of each of the curve of Fig. 7 is:

$$e_{zb} = E_{zb} \cos\left(\frac{R}{2}t^2 - \theta\right) \qquad (1)$$

Where $e_{zb}$ = instantaneous value of zero beat voltage.

$E_{zb}$ = peak value of $e_{zb}$.

R = rate of change of frequency of frequency meter under calibration.

θ = difference in phase at instant of zero beat between the two component signals forming the beat wave—without regard to the absolute phase of either signal.

$t$ = time measured from the instant of zero beat.

The following additional notation is employed in the ensuing derivation of Equation 1.

$e_f$ = instantaneous voltage output of frequency meter under calibration.
$E_f$ = peak value of $e_f$.
$e_s$ = instantaneous voltage output of standard signal.
$E_s$ = peak value of $e_s$.
$\theta_f$ = instantaneous value of the argument of the sine function in the expression $e_f = E_f \sin \theta_f$.
$w_f$ = instantaneous periodicity ($2\pi f$) of $e_f$.
$w_s$ = periodicity of ($2\pi f$) of standard signal (a constant).
$R$ = rate of change of $$w_f = \frac{dw_f}{dt} = \frac{d^2\theta_f}{dt^2}$$

$\phi_f$ = phase angle of frequency meter signal at instant of zero beat (equals $\theta_f$ at instant of zero beat).
$\phi_s$ = phase angle of standard signal (equals $\theta_s$ at instant of zero beat).

Since $$w_f = \frac{d\theta_f}{dt}$$

it follows that $\theta_f = \int w_f dt$

Then:

$$e_f = E_f \sin \theta_f = E_f \sin \int w_f dt$$

$$w_f = w_s + Rt$$

$$\int w_f dt = \int (w_s + Rt) dt = w_s t + \frac{R}{2}t^2 + \phi_f$$

$$\therefore e_f = E_f \sin \left(w_s t + \frac{R}{2}t^2 + \phi_f\right) \quad (2)$$

Similarly, $$e_s = E_s \sin (w_s t + \phi_s) \quad (3)$$

Now, let $$a = w_f t + \frac{R}{2}t^2 + \phi_f \quad (4)$$

$$b = w_s t + \phi_s \quad (5)$$

Then, $$(E_f \sin a)(E_s \sin b) = E_f E_s \sin a \sin b \quad (6)$$

$$= K_1 \frac{E_f E_s}{2}[\cos(a-b) - \cos(a+b)] \quad (7)$$

which follows from the trigonometric identity: $\sin a \sin b = \frac{1}{2}[\cos(a-b) - \cos(a+b)]$, $K_1$ being the efficiency factor of the mixer.

$$a - b = \frac{R}{2}t^2 = \theta \text{ (since } \theta = \phi_s - \phi_f) \quad (8)$$

$$a + b = 2w_s t + \frac{R}{2}t^2 + \phi_f + \phi_s \quad (9)$$

$(E_f \sin a)(E_s \sin b) =$ $$K_1\frac{E_f E_s}{2}\left[\cos\left(\frac{R}{2}t^2 - \theta\right) - \cos\left(2w_s t + \frac{R}{2}t^2 + \phi_f + \phi_s\right)\right] \quad (10)$$

In Equation (10), the expression $(E_f \sin a)(E_s \sin b)$ is equivalent to $e_{zb}$ of Equation (1), the expression $$K_1\frac{E_f E_s}{2}$$

defines the amplitude of the beat wave and is equivalent to $E_{zb}$ in Equation (1); the term $$\cos\left(\frac{R}{2}t^2 - \theta\right)$$

defines a low frequency component, and the term $$\cos\left(2w_s t + \frac{R}{2}t^2 + \phi_f + \phi_s\right)$$

defines a high frequency component which is filtered out and can, for that reason, be disregarded.

It should now be clear that the major problem arose from the fact that it is necessary, in order to save time, to drive the tuning shaft of the frequency meter continuously, and the further fact that the phase angle at zero beat between the component high frequency waves is entirely random, wherefore the beat waves cannot be directly utilized to produce pulses reliably coinciding with the successive zero beat occurrences. The solution of this major problem can be explained most advantageously as an incident to the description of that portion of the calibrator system illustrated diagrammatically in Figs. 2-5.

The system of Figs. 2-5 comprises two channels, identified as channel #1 and channel #2, respectively. Channel #1 embraces, in addition to the two standard signal generators, a radio frequency amplifier 6, a first-mixer 7, an intermediate frequency amplifier 8, a frequency multiplier 9 and an amplitude limiter 10.

Channel #2 comprises, in addition to the frequency meter under calibration, a dual-purpose stage 11, a first-mixer 12, an intermediate frequency amplifier 13, a frequency multiplier 14, and an amplitude limiter 15. A local oscillator 16 is common to both channels. A second-mixer 17 and another second-mixer 18 are each fed from both channels, jointly, and, therefore, cannot be said to be individual to either channel. The output of second-mixer 17 is passed through an integrator 19 and thence to the grid of a phase inverter tube 20 which controls a dual-tube square law detector stage 21.

The output of second-mixer 18 is likewise passed through an integrator 22 and thence to the grid of a phase inverter tube 23 which controls a dual-tube square law detector stage 24.

The outputs of both square law detector stages 21 and 24 are impressed upon opposite terminals of a potentiometer 25 which functions as a voltage adder; and, as a result of adding the outputs of the two square law detector stages, there appear at point 5, contemporaneously with the successive zero beats, recurrent negative pulses of uniform amplitude, which are capable of being employed to effect actuation of a mechanism for recording the coincident dial readings.

The recording mechanism, per se, may take any one of several optional forms and does not constitute a part of the present invention, except as an element of an entire system.

Since the pulses appearing at point 5 are relatively weak, and it is necessary to obtain considerably stronger pulses for triggering the preferred recorder, there is provided a blocking oscillator 26 which is capable of producing a powerful pulse in response to a weak triggering pulse. The blocking oscillator is preceded by a phase inverter 27 — which is necessitated by the fact that the blocking oscillator requires positive triggering pulses, whereas the pulses at point 5 are negative.

The dual-purpose stage 11 operates, without switching, to pass unaltered the 2.0–4.0 megacycle high band output of frequency meter 1, and to frequency multiply by sixteen the 125–250 k. c. low band output of the frequency meter. Hence, the output of the dual-purpose stage is a 2.0–4.0 megacycle band, irrespective of whether the input thereto is the frequency meter low band or the frequency meter high band. The output signals of the dual-purpose stage produced by the two bands are of the same order of magnitude. The first tube, 28, provides considerable gain on the low band, but attenuates the high band due to bypass capacitors 29, 29' shunting the plate load. Tube 30 functions as an amplifier on the high band, thus offsetting the high band loss in the first stage.

Since transformer 31 is tuned to the high band, it functions, in conjunction with tube 30, as a frequency multiplier with respect to the low band. This introduces losses which offset the amplification of the low band effected by tube 28.

The dual-purpose stage just described was devised by Joseph Tellier and is believed to be solely his invention.

Radio frequency amplifier 6 is tunable throughout the 2.0–4.0 megacycle band and is preferably sharp enough to pass without attenuation only one harmonic at a time. The output of this amplifier is impressed upon the signal input grid of first-mixer 7. The oscillator injection grid of that mixer is connected via conductor 32 to the plate of tube 33 — which tube forms a part of local oscillator 16. The oscillator shown is of the Hartley type and the plate of tube 33 is electron-coupled thereto.

The output of the dual-purpose stage is connected through conductor 34 to the signal input grid of first-mixer 12 via a tuned grid circuit 35; and the oscillator injection grid of the same mixer is connected to local oscillator 16 via conductor 36.

The local oscillator is gang-connected to the frequency meter and to the radio frequency amplifier 6, as well as the tuned input circuits of both first-mixers—all of which is indicated by the broken intercoupling lines 37. By virtue of this ganged connection the frequency of the signal at the output of dual-purpose stage 11 is always the same as the frequency to which amplifier 6 is tuned and likewise the frequency to which the inputs of the two first-mixers are tuned. But local oscillator 16 is so adjusted that at all times its output is of higher frequency than that of the other signals being impressed upon the two first-mixers—and this by an amount equal to the desired intermediate frequency. It was found that 480 k. c. was a desirable intermediate frequency. Hence, the local oscillator is designed to cover a range from 2.48 mc. to 4.48 mc.

The output of I. F. amplifier 13 is a continuous wave having a substantially constant amplitude and constant frequency of 480 k. c. But the output of I. F. amplifier 8 comprises a continuous series of discrete intermediate frequency signals, each varying in frequency, with time, from approximately 475 k. c. to 485 k. c. and having a center frequency of 480 k. c.—which latter is the same as the output frequency of I. F. amplifier 8. In order to avoid formation of irregular zero beats, which would be likely to cause untimely operation of the recorder, it is necessary to restrict the band width of I. F. amplifier 8 to approximately ± 5 k. c.

In both channels the intermediate frequency amplifiers are followed by frequency multipliers. These are identified by reference numerals 9 and 14, respectively, and they are, specifically, frequency triplers—although any desired multiplication could be employed. An explanation as to the reason for providing the frequency multipliers can best be introduced at a subsequent point in this specification and will accordingly be deferred.

The output of the frequency tripler 14 is a continuous wave of 1440 k. c., while the output of tripler 9 is a consecutive series of intermediate frequency signals each varying in frequency, with time, from 1425 k. c. to 1455 k. c., or vice versa, and having a center frequency of 1440 k. c.

The objective is to obtain a usable indication corresponding to each periodical instant when the frequency of the output of tripler 9 reaches, momentarily, 1440 k. c., and thus coincides with the output frequency of channel #2—which condition obtains whenever and only when the output of the meter under calibration (or a 16th multiple in the case of the low band) is identical in frequency with one of the harmonics from one or the other standard signal generator.

Due to the fact that there is a very considerable disparity in signal strength as between the various harmonics propagated by the standard signal generators, and to the further fact that it is important that the recurrent pulses developed at point 5 be of substantially uniform magnitude, there is included in channel #1 an amplitude limiter 10. Amplification in the I. F. stage 8 or the R. F. stage 6, or both, is such that even the weakest harmonic will cause the plate current of limiter 10 to reach saturation. Thus, the output of limiter 10 is of constant amplitude irrespective of the strength of the harmonic. Increased uniformity of the signals impressed upon the input of limiter 10 can be achieved through application of automatic volume control voltage to the grid of R. F. amplifier 6 and the signal grid of mixer 7. Conductor 38 serves this purpose. Since it is desirable that the outputs of the two channels be of substantially equal amplitude, there is also included in channel #2 an amplitude limiter 15.

Now the problem which has to be dealt with is that of beating together and utilizing the outputs of the two amplitude limiters in such a way as to obtain a pulse concurrently with each successive frequency coincidence—which pulse is invariably sufficient and suitable to trigger a recording mechanism. The problem is complicated, in part by the fact that each frequency coincidence or zero beat is of but instantaneous duration, and, further, by the fact that the two combining waves have no fixed phase relation with respect to each other at and adjacent frequency coincidence. The phase angle between them may be anything from zero to 360°. This means that the amplitude of the beat wave at frequency coincidence will range from zero to maximum—for which reason it is incapable of being directly utilized to achieve highly accurate triggering of a recorder.

The first step in the solution of the stated problem consists in combining portions of the outputs of the two amplitude limiters in such a way that there are produced, at and immediately adjacent each frequency coincidence, two beat waves which are identical except that they are mutually phase-displaced by an angle of 90°. This is accomplished by directly beating together in second-mixer 17 a portion of the output of limiter 10 with a portion of the output of limiter 15, and by beating together in second-mixer 18 another portion of the output of limiter 10 and another portion of the output of limiter 15, which latter is shifted in phase by 90°, as compared to that portion of the output of limiter 15 which is impressed upon second-mixer 17.

One input grid of mixer 17 is fed directly from the plate of limiter 15 via conductor 39 and blocking condenser 40, while the second input grid of the same mixer is fed from the secondary of transformer 41. On the contrary, the two input grids of mixer 18 are fed from the two secondaries of transformers 41 and 42—one of the last mentioned grids being connected to the secondary of transformer 41 by way of conductor 43 and blocking condenser 44.

Since transformer 42 is loosely coupled and is tuned to 1440 k. c. it follows that the voltage across the secondary thereof is 90° out of phase with the voltage across the primary winding, wherefore the beat frequency output of second-mixer 18 is out of phase, to the same degree, with the beat frequency output of second-mixer 17. And this holds true for all frequencies, including zero.

The output of each second-mixer is a continuous series of discrete beat wave signals, each starting at about 15 k. c. and uniformly decreasing through zero frequency and thereafter uniformly increasing to a final value of about 15 k. c.

As illustrated by the graphs of Fig. 7 the voltage of the beat waves produced by second-mixers 17 and 18 may each have any value from zero to maximum when zero beat occurs; but whatever voltage value may happen to obtain at zero beat as respects either one of the two beat waves, the voltage of the other will differ from the first by 90°. If, for instance, one value happens to be zero the other will be a positive or negative maximum; and if one has an intermediate value the other will have another intermediate value differing therefrom by 90°. One voltage may be positive and the other negative, or both may be positive or both negative. Having produced two beat waves which are mutually phase-displaced by 90°, the next step is to produce from each such wave, separately, a pronounced signal pulse which is coincident with zero beat. That result is here achieved by separately integrating the outputs of the two second-mixers, but it may, alternatively, be accomplished by differentiation of said two outputs, or by any suitable means capable of converting frequency changes into commensurate amplitude changes.

The integrator 19 which follows second-mixer 17 comprises a series resistor 45 having a value of 0.33 megohm and a shunt capacitor 46 having a value of 0.5 mf. Capacitor 46 is, in this particular instance, shunted by a grid-leak resistor 47, which, of course, impairs to some extent the effectiveness of said capacitor, but not seriously. Manifestly, elements 45 and 46 cannot afford exact integration, since, in theory at least, that can be realized only with a resistance and capacitance both of which are of infinite magnitude. However, there is achieved an approach to complete integration which is entirely adequate for the purposes of the present invention, and it is to be understood that in referring to integrators and integration I do not wish to be construed as using those terms in the rigorous mathematical sense. Integrator 22 consists of a series resistor 48 and shunt capacitor 49, which latter is shunted by grid-leak resistor 50. These may be identical with elements 45, 46 and 47 respectively.

Figure 8:
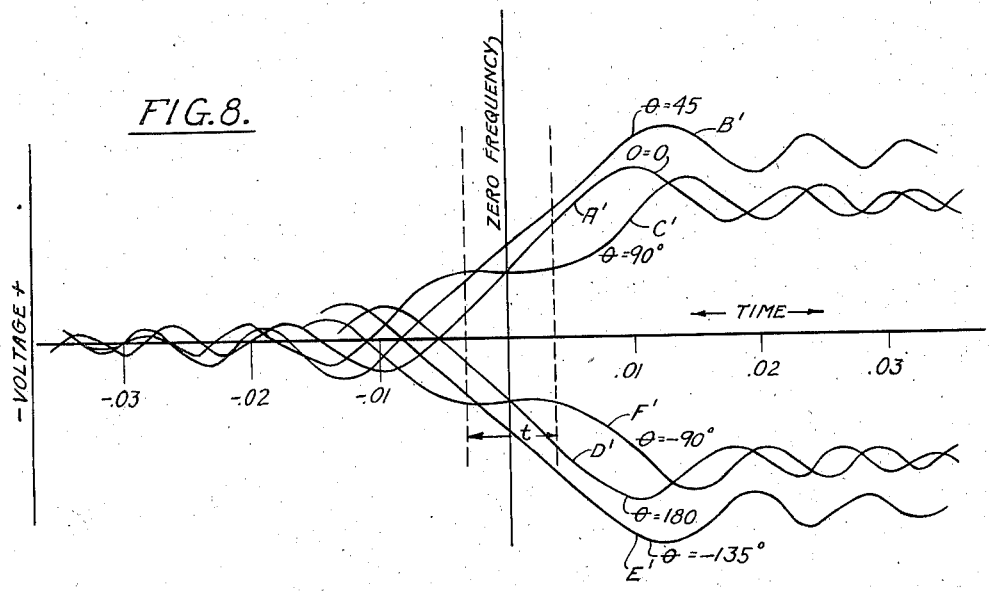
Fig. 8 is a composite graph illustrating the results of integrating each of the beat waves of Fig. 7.

The voltage output of each integrator is illustrated graphically in Fig. 8. Each different phase angle which may happen to obtain between the two component signals forming a beat wave will give rise to a corresponding integrated voltage curve. Thus, curve A', Fig. 8, depicts the result of integrating beat wave A, Fig. 7. Likewise, curve B', Fig. 8, is the graph of the integral of curve B etc. Just as there are an infinite number of possible beat waves, Fig. 7, there are similarly an infinite number of possible integral curves, Fig. 8—each corresponding to an individual phase difference between the component signals.

It will be observed that some of the curves of Fig. 8, namely, A', B', C', rise rather sharply to the positive side of the zero voltage axis just prior to zero frequency, while curves D', E', and F' drop below the zero voltage axis and are, respectively, the inverse counterparts of curves A', B', and C'. If all possible curves were included in Fig. 8, or a large enough number to be conclusively representative, it would be found that one-half of them would rise above the zero voltage axis while the remainder would drop below. Each curve of Fig. 8 represents the integral of Equation 1 for some particular value of $\theta$. The value of the integral at any instant of time can be ascertained from the Fresnel tables.

Figure 9:
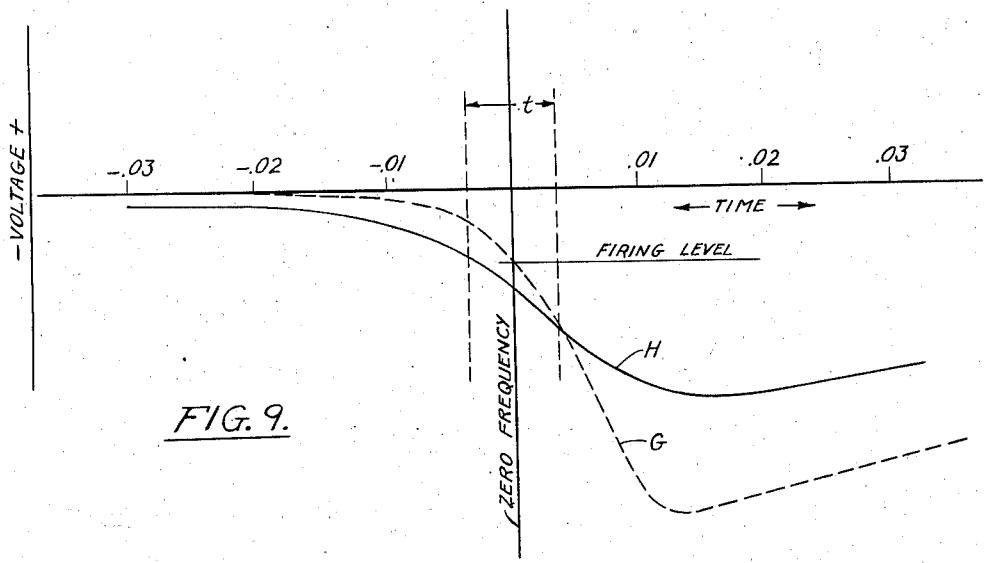
Fig. 9 is a graph depicting the result of separately squaring any two quadrature-related waves of Fig. 8 and then adding the squares.

In Fig. 9 the dotted curve G is indicative of the pulse which occurs at point 5 coincidentally with each zero beat; which pulse is the result of squaring and adding together two quadrature-related simultaneous integrated voltages per Fig. 8. Also included in Fig. 9 is a curve H which is the envelope, on the negative side, embracing the curves of Fig. 8 on the negative side of the zero voltage axis. It is to be understood that the complete envelope includes an additional curve, complementary to curve H and disposed on the positive side of the zero voltage axis. The latter has been omitted from Fig. 9 because it would serve no useful purpose to show it.

It will now be shown mathematically that curve G is independent of the magnitude of the phase angle which may happen to obtain between the component waves which combine to form the outputs of the respective second-mixers, and also that curve G is the square of envelope H. From the mathematical demonstration which follows it will be seen that the pulses appearing at point 5 are wholly independent of the magnitude of said phase angle, and that said pulses are, accordingly, all alike.

Given the function $f_1(x) = \int \cos(x^2+\theta)\,dx$ (11)

A second form of the function differing in phase from (11) by 90° is:

$$f_2(x) = \int \cos\left(x^2+\theta+\frac{\pi}{2}\right)dx \qquad (12)$$

$$= \int \sin(x+\theta)dx \qquad (13)$$

It is desired to show that $$[f_1(x)]^2 + [f_2(x)]^2 = f_3(x)$$

where $f_3(x)$ is independent of $\theta$, and that its amplitude is equal to the square of the envelope of $f_1(x)$ plotted for all values of $\theta$.

Expanding (11):

$$f_1(x) = \int \cos x^2 \cos\theta\,dx - \int \sin x^2 \sin\theta\,dx$$
$$= \cos\theta \int \cos x^2 dx - \sin\theta \int \sin x^2 dx$$

Simplifying, let $$C = \int \cos x^2 dx$$

and let $$S = \int \sin x^2 dx$$

Then $$f_1(x) = C\cos\theta - S\sin\theta \qquad (14)$$

Similarly, $$f_2(x) = C\sin\theta + S\cos\theta \qquad (15)$$

Hence, $$[f_1(x)]^2 + [f_2(x)]^2 = (C\cos\theta - S\sin\theta)^2 +$$
$$(C\sin\theta + S\cos\theta)^2 = C^2 + S^2 = f_3(x) \qquad (16)$$

and $f_3(x)$ is obviously independent of $\theta$.

It will now be shown that curve G is the square of the envelope H—which is further proof that the pulse G is independent of the phase angle.

Let (15) represent the general function. To determine the amplitude of the envelope at any point $x$, the function must be maximized with respect to $\theta$, holding $x$ constant.

$$\frac{d}{d\theta}[C \sin\theta + S \cos\theta] = C \cos\theta - \sin\theta = 0 \; \tan\theta = \frac{C}{S}$$

$$\sin\theta = \frac{C}{\sqrt{S^2+C^2}}$$

$$\cos\theta = \frac{S}{\sqrt{S^2+C^2}}$$

$$C \sin\theta = C\frac{C}{\sqrt{S^2+C^2}}$$

$$S \cos\theta = S\frac{S}{\sqrt{S^2+C^2}}$$

Thence, the envelope $= C\frac{C}{\sqrt{S^2+C^2}} +$ $$S \cdot \frac{S}{\sqrt{S^2+C^2}} = \sqrt{S^2+C^2} \quad (17)$$

and the square of (17) is equal to the square of (16).

The integrated quadrature-related voltages are impressed, respectively, upon the grids of phase inverter tubes 20 and 23. The plate of tube 20 is connected through coupling capacitor 51 to the control grid of detector tube 52 while the cathode of tube 20 is connected through capacitor 53 with the control grid of tube 54. The control grids of both detector tubes 52 and 54 are biased to cut-off. When the grid of phase inverter tube 20 goes negative it causes the control grid of tube 52 to go positive while the grid of tube 54 remains below cut-off. When, on the other hand, the grid of tube 20 goes positive the control grid of tube 52 remains below cut-off while the control grid of tube 54 goes positive. As a result, detector tubes 52 and 54 respond respectively to negative and positive voltages on the grid of tube 20 and, consequently, the voltage produced at junction 55 via coupling condenser 57 is the second harmonic or square of the integrated voltage impressed upon the grid of tube 20—but increased to the extent of whatever gain may be afforded by the detector tubes.

The operation of phase inverter 23 and square-law stage 24 is exactly the same as that of inverter 20 and square-law stage 21.

The voltage at junction 56 is equal to but 90° out of phase with the voltage at junction 55, and these two quadrature-related voltages are, as will be apparent, always negative. They are impressed upon opposite resistor terminals of potentiometer 25 and, consequently, the voltage at point 5 is always the mean between the two voltages at 55 and 56. The contactor of potentiometer 25 is made adjustable to compensate for any possible inequality between the outputs of the two square-law stages. The recurrent pulses at point 5 are always of the same magnitude and of the same polarity, and they coincide, to a very high degree of accuracy with the zero beat occurrences. Any recording mechanism may be employed which is susceptible of being triggered directly or indirectly by the pulses occurring at point 5 and capable of recording coincident instantaneous dial readings of the frequency meter under calibration. For a description of the recording mechanism actually employed see the aforementioned "Electronics" article. Another suitable recorder is described in the co-pending application of David E. Sunstein, Serial Number 534,384, filed May 5, 1944, now Patent Number 2,436,235.

The phase inverter 27 and blocking oscillator 26 serve to produce more powerful pulses than are readily obtainable at point 5. While said pulse inverter and blocking oscillator are important as respects the entire calibrating system including the particular recording mechanism actually employed, it will be evident that they constitute more or less optional equipment insofar as my fundamental invention is concerned. The function of phase inverter 27 is to convert the negative pulses appearing at point 5 into positive pulses for application to grid 59 of the blocking oscillator tube.

The mode of operation of the blocking oscillator is as follows:

The two cathodes are normally maintained at a potential which is sufficiently negative to render both tube sections nonconductive. A positive pulse impressed on grid 59 institutes a current flow through primary winding 60 of transformer 61. This induces in secondary winding 62 a voltage which renders grid 63 positive and thus gives rise to a plate current flow in the right-hand section of the tube. Thus, the right-hand section of the blocking oscillator tube operates regeneratively, by virtue of feed-back through transformer 61, and, as a result, the potential at junction 64 and output terminal 65 rises to a high positive value determined by the plate saturation of the tube. When tube saturation occurs the change of current through primary 60 ceases and grid 63 is quickly restored to its normal potential—which completes the operating cycle of the oscillator.

To achieve the required dial scale precision mentioned at the beginning of this specification it is necessary to make certain that triggering of the recorder be effected within a tolerance of ±20 cycles when the output of the meter under calibration is at the low end of the 2.0–4.0 mc. band, and within a tolerance of ±40 cycles at the high end of said band—the permissible deviation being proportionate for all intermediate points; and the same degree of dial scale precision must be maintained with respect to the low band. Having those facts in mind, it is now in order to explain the purpose and effect of tripling or otherwise multiplying the output frequency of I. F. amplifiers 8 and 13. The objective is to increase the steepness of wave-front of the pulses at point 5, as represented by curve G, Fig. 9, so that a dependable triggering voltage will occur sufficiently close to each zero beat to ensure that each dial reading is accurate within the prescribed limits.

In Figs. 8 and 9 the zero voltage axes are divided into units of time, and the interval "$t$" laid off thereon corresponds to a period of .0036 sec. either side of zero beat or a total of .0072 sec. The latter corresponds to a 40 cycle frequency change in the high band output of the frequency meter or a 20 cycle change at either side of zero beat—which, as said before, is the maximum allowable deviation at the low end of the high band if accuracy of calibration is to be maintained within the permitted tolerance. If curve G is sufficiently steep within the interval "$t$," it follows that the change of voltage at point 5, within the allowed time, will be sufficient to ensure that triggering of the recorder will always occur closely enough to exact zero beat to meet the prescribed requirements.

From inspection of Equation 1 it will be seen that the time required for the beat to go through that distinctive period adjacent zero beat during which the integrated beat voltage (Fig. 8)

rises or falls sharply is proportional to R—which is the rate of change of frequency of the frequency meter under calibration. Hence, by increasing the value of R through frequency multiplication, the slope of curve G is increased.

It might erroneously be imagined that the frequency triplers serve merely to offset, in part, a loss due to the frequency step-down effected by first-mixers 6 and 12, but such is not the case. This is explained by the fact that the frequency rate of change of the I. F. output of first-mixer 7 is the same as the rate of change of the high band output of the frequency meter under calibration. Hence, no loss of calibration precision accrues from the frequency reduction which precedes the frequency multiplication.

If the first-mixers and I. F. amplifiers were eliminated, thus sacrificing the innate advantages of the superheterodyne, it would still be necessary to introduce the same amount of frequency multiplication in order to realize the same steepness of wave front (curve G, Fig. 9) as is accomplished with the arrangement illustrated.

It will be observed that local oscillator 16 is provided with automatic frequency control connected to I. F. amplifier 13. The object in so doing is to ensure constancy of the 1440 k. c. output of frequency tripler 14 so that transformer 42, which is tuned to 1440 k. c., will produce a constant 90° phase shift. It is of interest to note that in the absence of the first heterodyning operation the phase shifting transformer 42 would have to be made tunable throughout the 2.0–4.0 megacycle band.

I claim:

1. The method of indicating frequency coincidence which comprises combining two signal waves to produce a first beat wave which passes through zero frequency, simultaneously combining said signal waves to produce a second beat wave which is approximately ninety-degrees phase-displaced from said first beat wave and which passes through zero frequency coinstantaneously with said first beat wave, utilizing said beat waves, separately and concurrently, each to produce, individually, a wave characterized by a pronounced amplitude change marking the occurrence of zero frequency, separately squaring said last mentioned waves concurrently, and adding the squared waves to produce a voltage pulse.

2. The method of indicating frequency coincidence which comprises combining two signal waves to produce a first beat wave which passes through zero frequency, simultaneously combining said signal waves to produce a second beat wave which is approximately ninety degrees phase-displaced from said first beat wave and which passes through zero frequency coinstantaneously with said first beat wave, separately integrating said beat waves, and combining the integrated beat waves to produce a voltage pulse.

3. The method of indicating frequency coincidence which comprises combining two signal waves to produce a first beat wave which passes through zero frequency, simultaneously combining said signal waves to produce a second beat wave which is approximately ninety degrees phase-displaced from said first beat wave and which passes through zero frequency coinstantaneously with said first beat wave, utilizing said beat waves, separately and concurrently, each to produce, individually, a wave characterized by a pronounced amplitude change marking the occurrence of zero frequency, and combining the last-mentioned waves to produce a voltage pulse.

4. The method of indicating frequency coincidence as between two signal waves, when the frequency of at least one of said waves is continuously changing, which method comprises, as a first step, combining the two signal waves to produce a first beat wave which passes through zero frequency, and simultaneously combining said signal waves to produce a second beat wave which is approximately ninety degrees phase-displaced from said first beat wave and which passes through zero frequency coinstantaneously with said first beat wave; as a second step, utilizing said beat waves, separately and concurrently, each to produce, individually, a wave characterized by a pronounced amplitude change marking the occurrence of zero frequency; as a third step, separately squaring said last-mentioned waves concurrently; and, as a fourth step, adding the squared waves to produce a voltage pulse.

5. The method of indicating frequency coincidence as between two signal waves, when the frequency of at least one of said waves is continuously changing, which method comprises, as a first step, combining the two signal waves to produce a first beat wave which passes through zero frequency, and simultaneously combining said signal waves to produce a second beat wave which is approximately ninety degrees phase-displaced from said first beat wave and which passes through zero frequency coinstantaneously with said first beat wave; as a second step, utilizing said beat waves, separately and concurrently, each to produce, individually, a wave characterized by a pronounced amplitude change marking the occurrence of zero frequency; as a third step, impressing each of the last-mentioned waves, separately, upon networks whose outputs differ from proportionality with the inputs supplied thereto; and, as a fourth step, combining the outputs of said networks to produce a voltage pulse.

6. The method of indicating frequency coincidence as between two signal waves, where the frequency of at least one of said waves is continuously changing, which method comprises, as a first step, combining the two signal waves to produce a first beat wave which passes through zero frequency, and simultaneously combining said signal waves to produce a second beat wave which is approximately ninety degrees phase-displaced from said first beat wave and which passes through zero frequency coinstantaneously with said first beat wave; as a second step, simultaneously and separately integrating said first and second beat waves; as a third step, simultaneously and separately squaring the two integral waves; and, as a fourth step, adding the two squared integral waves to produce a voltage pulse.

7. The method of indicating frequency coincidence as between two signal waves, where the frequency of at least one of said waves is continuously changing, which method comprises, as a first step, combining the two signal waves to produce a first beat wave which passes through zero frequency, and simultaneously combining said signal waves to produce a second beat wave which is approximately ninety degrees phase-displaced from said first beat wave and which passes through zero frequency coinstantaneously with said first beat wave; as a second step, simultaneously and separately integrating said first and second beat waves; as a third step, impressing each of the two integrated waves, separately, upon networks whose outputs differ from proportionality with the inputs supplied thereto; and, as a fourth step, adding the outputs of said networks to produce a voltage pulse.

8. The method of calibrating a frequency meter of the signal generator type, which comprises continuously increasing or decreasing the output frequency of the frequency meter through a predetermined frequency band while at the same time varying the output frequency of a local oscillator so as to maintain a constant frequency difference between the frequency meter output and the local oscillator output, combining the output of the frequency meter with that of the local oscillator to produce a beat wave of constant frequency, combining the output of the local oscillator, consecutively and individually, with each of a series of harmonic frequency waves to produce a recurrent series of alternating current beat signals, each having a center frequency equal to that of said beat wave, consecutively mixing a portion of each of said beat signals with a portion of said constant frequency beat wave to form a recurrent series of first lower frequency beat signals each of which passes through zero frequency, phase shifting through an angle of ninety degrees a portion of said constant frequency beat wave, consecutively mixing the phase-shifted portion of said beat wave with another portion of each of said recurrent series of beat signals to form a second recurrent series of lower frequency beat signals each of which is in phase quadrature to the coincident first lower frequency beat signal and passes through zero frequency coinstantaneously with said coincident first lower frequency beat signal, utilizing said lower frequency beat signals, separately and concurrently, to produce, individually, a wave characterized by a pronounced amplitude change marking the occurrence of zero frequency, separately squaring the last-mentioned waves, and adding the squared waves to produce a voltage pulse.

9. The method according to claim 4 including the additional steps of multiplying the frequency of the constant frequency beat wave and of equally multiplying the frequency of the first-mentioned beat signals, said step being performed prior, in each case, to the recited mixing operations.

10. The method according to claim 4 wherein the waves characterized by a pronounced amplitude change marking the occurrence of zero frequency each are produced by integrating, respectively and separately, the coincident lower frequency beat signals, prior, in each case, to the squaring operation.

11. The method according to claim 4 including the additional steps of multiplying the frequency of the constant frequency beat wave and of equally multiplying the frequency of the first-mentioned beat signals, said steps being performed prior, in each case, to the recited mixing operations, said method being further distinguished in that the quadrature-related coincident lower frequency beat signals are separately integrated and thereafter separately squared and then added.

12. In an automatic calibrating system, a mixer, means for impressing upon said mixer a pair of signal waves to produce a first alternating current beat signal whose frequency decreases from a maximum value to zero and then increases to a maximum value, another mixer, means for impressing upon the last-mentioned mixer a second pair of signal waves which is substantially identical with the first-mentioned pair except that the phase angle between the members of the second pair differs by approximately ninety degrees from the phase angle between the members of the first pair, devices individual to said mixers and connected, respectively, to the outputs thereof and operative to translate frequency variations into amplitude variations, a pair of networks whose outputs are disproportionate to their inputs, said networks having their inputs connected, individually, to said devices, and recording means responsive to the conjoint outputs of said networks.

13. In an automatic calibrating system, a mixer, means for impressing upon said mixer a pair of signal waves to produce a first alternating current beat signal whose frequency decreases from a maximum value to zero and then increases to a maximum value, another mixer, means for impressing upon the last-mentioned mixer a second pair of signal waves which is substantially identical with the first-mentioned pair except that the phase angle between the members of the second pair differs by approximately ninety degrees from the phase angle between the members of the first pair, said last-mentioned mixer being operative to produce a second alternating current beat signal substantially identical with the first-mentioned beat signal but in phase quadrature with respect thereto, a pair of integrators, each connected, individually, to the outputs of said mixers, a pair of networks whose outputs are disproportionate to their inputs, said networks having their inputs connected, individually, to said integrators, and recording means responsive to the conjoint outputs of said networks.

14. In an automatic calibrating system, a mixer, means for impressing upon said mixer a pair of signal waves to produce a first alternating current beat signal whose frequency decreases from a maximum value to zero and then increases to a maximum value, another mixer, means for impressing upon the last-mentioned mixer a second pair of signal waves which is substantially identical with the first-mentioned pair except that the phase angle between the members of the second pair differs by approximately ninety degrees from the phase angle between the members of the first pair, said last-mentioned mixer being operative to produce a second alternating current beat signal substantially identical with the first-mentioned beat signal but in phase quadrature with respect thereto, a pair of integrators, each connected, individually, to the outputs of said mixers, a pair of square law detectors each having its input connected through one of said integrators to the output of one of said mixers, and recording means responsive to the conjoint outputs of said detectors.

15. In an automatic calibrating system, a mixer, means for impressing upon said mixer a pair of signal waves to produce a first alternating current beat signal whose frequency decreases from a maximum value to zero and then increases to a maximum value, another mixer, means for impressing upon the last-mentioned mixer a second pair of signal waves which is substantially identical with the first-mentioned pair except that the phase angle between the members of the second pair differs by approximately ninety degrees from the phase angle between the members of the first pair, said last-mentioned mixer being operative to produce a second alternating current beat signal substantially identical with the first-mentioned beat signal but in phase quadrature with respect thereto, a pair of square law detectors having their inputs coupled, respectively and individually, to the outputs of said mixers, means individual to said mixers and interposed, each, between one of said mixers and its associated square law detector for converting frequency changes of the respective beat signals into coincident voltage amplitude changes, and means for adding the outputs of said square law detectors.

16. In an automatic calibrating system, a mixer, means for impressing upon said mixer a pair of signal waves to produce a first alternating current beat signal whose frequency decreases from a maximum value to zero and then increases to a maximum value, another mixer, means for impressing upon the last-mentioned mixer a second pair of signal waves which is substantially identical with the first-mentioned pair except that the phase angle between the members of the second pair differs by approximately ninety degrees from the phase angle between the members of the first pair, said last-mentioned mixer being operative to produce a second alternating current beat signal substantially identical with the first-mentioned beat signal but in phase quadrature with respect thereto, a pair of square law detectors having their inputs coupled, respectively and individually, to the outputs of said mixers, an integrator interposed between one of said mixers and its associated square law detector, a second integrator interposed between the other of said mixers and its associated square law detector, and means for adding the outputs of said square law detectors.

17. In a system for indicating frequency coincidence, a mixer, means for impressing upon said mixer, concurrently, a first signal wave and a second signal wave, at least one of which varies in frequency through a range including a center frequency which equals the coincident frequency of the other signal wave, a phase shifter for deriving from said second signal wave a third signal wave which is approximately ninety degrees phase-displaced from said second signal wave, another mixer, means for impressing upon the last-mentioned mixer, concurrently, said first and third signal waves, two square law detectors, each having their inputs coupled individually to the outputs of the respective mixers, two integrators, each interposed, individually, between one of said mixers and its associated square law detector, and a voltage adder interconnecting an output terminal of one of said detectors with a corresponding output terminal of the other detector.

18. In a system for indicating frequency coincidence, a first channel and a second channel, a signal generator operative to propagate simultaneously a plurality of signals of different predetermined frequencies, said first channel including a first-mixer and selector means for selecting said signals individually and impressing the same upon said first-mixer, said first channel also including an intermediate frequency amplifier following said first-mixer, said second channel including another first-mixer followed by an intermediate frequency amplifier, means for impressing upon the last-mentioned first-mixer a signal wave of continuously varying frequency, a local oscillator coupled to both first-mixers, a ninety degree phase shifter, a second-mixer coupled directly to both said channels without the interposition of said phase shifter, another second-mixer coupled directly to one of said channels and coupled to the other of said channels through said phase shifter, said second-mixers being operative to combine signals from both said channels to produce simultaneously two separate beat wave signals which are substantially identical except that they are mutually phase-displaced by approximately ninety degrees, each of said beat wave signals being characterized in that its frequency decreases from a maximum starting value through zero and then increases to a maximum final value, separate means responsive to the beat wave output of each said second-mixers for producing a pronounced voltage pulse coincidently with and marking the occurrence of zero frequency, a pair of square law detectors for squaring said voltage pulses individually, and means for combining the outputs of said square law detectors.

19. In a system for indicating frequency coincidence, a first channel and a second channel, a signal generator operative to propagate simultaneously a plurality of signals of different predetermined frequencies, said first channel including a first-mixer and selector means for selecting said signals and impressing the same upon said first-mixer, said first channel also including an intermediate frequency amplifier following said first mixer, said second channel including another first-mixer followed by an intermediate frequency amplifier, means for impressing upon the last-mentioned first-mixer a signal wave of continuously varying frequency, a local oscillator coupled to both first-mixers, a ninety degree phase shifter, a second-mixer coupled directly to both said channels without the interposition of said phase shifter, another second-mixer coupled directly to one of said channels and coupled to the other of said channels through said phase shifter, said second-mixers being operative to combine signals from both said channels to produce simultaneously two separate beat wave signals which are substantially identical except that they are mutually phase-displaced by approximately ninety degrees, each of said beat wave signals being characterized in that its frequency decreases from a maximum starting value through zero and then increases to a maximum final value, separate means responsive to the beat wave output of each said second-mixers for producing, each, a pronounced amplitude change coincidentally with and marking the occurrence of zero frequency, and means for utilizing the outputs of said separate means, conjointly, for indicating coincidence between said signal wave of continuously varying frequency and one of said signals of different predetermined frequencies.

20. In a system for indicating frequency coincidence, a first channel and a second channel, a signal generator operative to propagate simultaneously a plurality of signals of different predetermined frequencies, said first channel including a first-mixer and selector means for selecting said signals and impressing the same upon said first-mixer, said first channel also including an intermediate frequency amplifier following said first-mixer, said second channel including another first-mixer followed by an intermediate frequency amplifier, means for impressing upon the last-mentioned first-mixer a signal wave of continuously varying frequency, a local oscillator coupled to both first-mixers, a ninety degree phase shifter, a second-mixer coupled directly to both said channels without the interposition of said phase shifter, another second-mixer coupled directly to said first channel and coupled to said second channel through said phase shifter, said second-mixers being operative to combine signals from both said channels to produce simultaneously two separate beat wave signals which are substantially identical except that they are mutually phase-displaced by approximately ninety degrees, each of said beat wave signals being characterized in that its frequency decreases from a maximum starting value through zero and then increases to a maximum final value, separate means responsive to the beat wave output of each said second-mixers for producing, each, a pronounced amplitude change coincidentally with and marking the occurrence of zero frequency, and means for utilizing the outputs of said separate means, conjointly, for indicating coincidence between said signal wave of continuously varying frequency and one of said signals of different predetermined frequencies.

21. In a system for indicating frequency coincidence, a first channel and a second channel, a signal generator operative to propagate simultaneously a plurality of signals of different predetermined frequencies, said first channel including a first-mixer and an amplifier which is tunable to select said signals and to impress the same upon said first-mixer, said first channel also including an intermediate frequency amplifier following said first-mixer, said second channel including another first-mixer followed by another intermediate frequency amplifier, means for impressing upon the last-mentioned first-mixer a signal wave of continuously increasing or decreasing frequency, a local oscillator coupled to both first-mixers, a ninety degree phase shifter, a second-mixer coupled directly to both said channels without the interposition of said phase-shifter, another second-mixer coupled directly to one of said channels and coupled to the other of said channels through said phase shifter, said second-mixers being operative to combine signals from both said channels to produce simultaneously two separate beat wave signals which are substantially identical except that they are mutually phase-displaced by approximately ninety degrees, each of said beat wave signals being characterized in that its frequency decreases from a maximum starting value through zero and then increases to a maximum final value, a pair of square law detectors, each coupled, individually, to the output of one of said second-mixers, a pair of integrators, each interposed between one of said second-mixers and its associated square law detector, and an adder for combining the outputs of said square law detectors.

22. In a system for indicating frequency coincidence, a first channel and a second channel, a signal generator operative to propagate, simultaneously, a plurality of signals of different predetermined frequencies, said first channel including a first-mixer and an amplifier which is tunable to select said signals and to impress the same upon said first-mixer, said first channel also including an intermediate frequency amplifier following said first-mixer, and a frequency multiplier, said second channel including another first-mixer followed by another intermediate frequency amplifier and another frequency multiplier, means for impressing upon the last mentioned first-mixer a signal wave of continuously increasing or decreasing frequency, a local oscillator coupled to both first-mixers, a ninety degree phase shifter, a second-mixer coupled directly to both said channels without the interposition of said phase shifter, another second-mixer coupled directly to one of said channels and coupled to the other of said channels through said phase shifter, said second-mixers being operative to combine signals from both said channels to produce simultaneously two separate beat wave signals which are substantially identical except that they are mutually phase-displaced by approximately ninety degrees, each of said beat wave signals being characterized in that its frequency decreases from a maximum starting value through zero and then increases to a maximum final value, a pair of square law detectors, each coupled, individually, to the output of one of said second-mixers, a pair of integrators, each interposed between one of said second-mixers and its associated square law detector, and an adder for combining the outputs of said square law detectors.

23. In a system for indicating frequency coincidence, a first channel and a second channel, said first channel including a first-mixer, means for impressing, consecutively, upon said first-mixer a series of signal waves of different predetermined frequencies, a local source of oscillations connected to said first-mixer, said source having an output frequency which is variable through a predetermined frequency band, said source and said means being so intercoupled that as the frequency of said source progresses from end to end of said band it beats, successively, with each one of said signal waves while the latter is being impressed upon said first-mixer by said means, the output of said first-mixer being a series of beat frequency signals, said second channel including another first-mixer, means for impressing upon the last-mentioned first-mixer a signal wave of continuously increasing or decreasing frequency, said last-mentioned first-mixer being also connected to said source of oscillations, a ninety degree phase shifter, a second-mixer directly connected to both said channels without the interposition of said phase shifter, another second-mixer directly connected to one of said channels and connected to the other of said channels through said phase shifter, the output of each of said second-mixers being a series of discrete beat wave signals each characterized in that its frequency decreases from a maximum starting value through zero and then increases to a maximum final value, the members of each said series of discrete beat wave signals each being in phase quadrature to the concurrent member of the other said series, a pair of square law detectors, each connected individually to the output of one of said second-mixers, means individual to and interposed between each of said second-mixers and its associated square law detector for translating the change of frequency in the outputs of the second-mixers, at and immediately adjacent each zero beat, into pronounced amplitude changes each of which marks the occurrence of a zero beat, and means for adding the outputs of said square law detectors.

24. In a system for indicating frequency coincidence, a first channel and a second channel, said first channel including a first-mixer followed by an intermediate frequency amplifier together with a frequency multiplier and an amplitude limiter, means for impressing, consecutively, upon said first-mixer a series of high frequency signal waves of different predetermined frequencies, a local oscillator connected to said first-mixer, said local oscillator having an output frequency which varies continuously through a predetermined frequency band, said oscillator and said means being so intercoupled that as the frequency of said oscillator progresses from end to end of its band its output beats, successively, with each of said signal waves while the latter is being impressed upon said first-mixer by said means, the output of said first-mixer being a series of intermediate frequency beat signals, said second channel including another first-mixer followed by another intermediate frequency amplifier together with another frequency multiplier and another amplitude limiter, means for impressing upon the last-mentioned first-mixer a signal wave of continuously increasing or decreasing frequency, said last-mentioned first-mixer being also connected to said local oscillator, said local oscillator being gang-connected to both said means so as to maintain a constant intermediate frequency in said second channel and a predetermined range of frequency differences between the local oscillator output and each successive one of said signal waves during the time the latter is being impressed upon the first-mentioned first-mixer, a ninety degree phase shifter, a second-mixer directly connected to the outputs of both said channels without the interposition of said phase shifter, another second-mixer directly connected to the output of one of said channels and connected to the output of the other of said channels through said phase shifter, the output of each of said second-mixers being a series of discrete beat wave signals, each characterized in that its frequency decreases from a maximum starting value through zero and then increases to a maximum final value, the said signals of one said series each being in phase quadrature to the concurrent signal of the other said series, a pair of square law detectors, each connected individually to the output of one of said second-mixers, means individually to and interposed between each of said second-mixers and its associated square law detector for translating the change of frequency in the outputs of the second-mixers, at and immediately adjacent each zero beat, into pronounced amplitude changes each of which marks the occurrence of a zero beat, and means for adding the outputs of said square law detectors.

DAVID B. SMITH.

REFERENCES CITED

The following references are of record in the file of this patent:

UNITED STATES PATENTS

| Number | Name | Date |
|---|---|---|
| 1,931,873 | Marrison | Oct. 24, 1933 |
| 1,934,400 | Bollman | Nov. 7, 1933 |
| 2,044,749 | Usselman | June 16, 1936 |
| 2,086,892 | Barton | July 13, 1937 |
| 2,207,540 | Hansell | July 9, 1940 |